US012731892B2

(12) United States Patent
Chou et al.

(10) Patent No.: US 12,731,892 B2
(45) Date of Patent: Sep. 8, 2026

(54) ARRAY ANTENNA STRUCTURE WITH SIMPLIFIED PHASE CONTROL AND ANTENNA PRODUCT USING THE SAME

(71) Applicant: Strong-Wave Radio Technology Inc., Taoyuan City (TW)

(72) Inventors: Hsi Tseng Chou, Taoyuan City (TW); Zhi Da Yan, Taoyuan City (TW)

(73) Assignee: Strong-Wave Radio Technology Inc., Taoyuan City (TW)

( * ) Notice: Subject to any disclaimer, the term of this patent is extended or adjusted under 35 U.S.C. 154(b) by 100 days.

(21) Appl. No.: 18/896,896

(22) Filed: Sep. 26, 2024

(65) Prior Publication Data

US 2026/0005434 A1 Jan. 1, 2026

(30) Foreign Application Priority Data

Jun. 27, 2024 (TW) ................................ 113124099

(51) Int. Cl.
*H01Q 3/38* (2006.01)
*H01Q 1/12* (2006.01)
*H01Q 1/22* (2006.01)

(52) U.S. Cl.
CPC ............. *H01Q 3/38* (2013.01); *H01Q 1/1271* (2013.01); *H01Q 1/2258* (2013.01)

(58) Field of Classification Search
CPC ....... H01Q 3/38; H01Q 1/1271; H01Q 1/2258
See application file for complete search history.

(56) References Cited

U.S. PATENT DOCUMENTS

| | | | | |
|---|---|---|---|---|
| 5,206,655 | A | 4/1993 | Caille | |
| 6,473,447 | B1 | 10/2002 | Strich | |
| 6,559,798 | B1 * | 5/2003 | Marumoto | H01Q 21/0087 342/368 |
| 6,777,771 | B1 * | 8/2004 | Marumoto | H01Q 3/24 257/500 |
| 2009/0273517 | A1 * | 11/2009 | Thiesen | H01Q 21/065 342/372 |
| 2012/0056776 | A1 * | 3/2012 | Shijo | H01Q 21/064 342/146 |

(Continued)

FOREIGN PATENT DOCUMENTS

| | | | |
|---|---|---|---|
| CN | 117766991 | A | 3/2024 |
| TW | 201528611 | A | 7/2015 |
| TW | 202040867 | A | 11/2020 |

*Primary Examiner* — Hai V Tran

(57) ABSTRACT

An array antenna structure with simplified phase control and antenna product(s) thereof involve at least one metal waveguide element, at least one multilayer dielectric substrate with antenna units and low-resolution phase control units and joinable to the metal waveguide element, and at least one radio-frequency (RF) front-end module electrically connected to the metal waveguide element and the multilayer dielectric substrate to enable the antenna units to radiate and/or receive RF signals. Function amplification units of the RF front-end module are electrically connected to corresponding low-resolution phase control units and an unequal-length transmission line structure. The array antenna structure uses the low-resolution phase control units to reduce cost and circuit complexity, and produces the aperiodicity of initial phase excitation of the antenna units through the unequal-length transmission line structure.

16 Claims, 10 Drawing Sheets

(56) References Cited

U.S. PATENT DOCUMENTS

2014/0043189 A1* 2/2014 Lee ...................... H01Q 9/0485
342/368
2018/0175514 A1* 6/2018 Chou ..................... H01Q 3/385

* cited by examiner

ARRAY ANTENNA STRUCTURE WITH SIMPLIFIED PHASE CONTROL AND ANTENNA PRODUCT USING THE SAME

CROSS-REFERENCE TO RELATED PATENT APPLICATION

This non-provisional application claims priority to and the benefit of, under 35 U.S.C. § 119(a), Taiwan Patent Application No. 113124099, filed Jun. 27, 2024 in Taiwan. The entire content of the above identified application is incorporated herein by reference.

FIELD

The present disclosure is related to an array antenna structure, and more particularly to an array antenna structure having low-resolution phase control units that are arranged to be separate from function amplification units.

BACKGROUND

An array antenna system is usually composed of a plurality of antenna units, and the antenna units can collaborate with one another in order to control the direction in which the array antenna system transmits or receives radio-frequency (RF) signals (electromagnetic waves). An array antenna system, therefore, can provide directional beamforming and beam scanning functions, which are of great importance in military applications, radar-related applications, satellite communication applications, and modern mobile communication applications.

In a conventional array antenna system, each antenna element must be equipped with a phase shifter. Phase shifters are responsible for adjusting the phases of the signals passing through the antenna units, and hence for controlling the radiation beam transmitting/receiving direction of the array antenna as a whole, so as to precisely control the transmission/reception of RF signals. The phase shifters are typically provided in the antenna system, can be integrated in a beamforming integrated circuit (BFIC) chip or a transmitting/receiving module, and can change the amplitudes and phases of the excitation weights of the antenna units so as to control the beam direction of the array antenna. Generally speaking, a phase shifter of a relatively large number of bits (e.g., 6 bits) can provide higher-resolution phase control and therefore allows the desired beam direction to be formed with higher precision. However, a phase shifter of a relatively large number of bits generally requires to be manufactured on a micrometer or nanometer scale using a sophisticated semiconductor manufacturing process in order to ensure that high-frequency RF signals can be processed properly. In other words, phase shifters of a relatively large number of bits will add to the complexity of the circuit design, and thus increase the production cost, of an antenna system, which imposes tremendous limitations on cost-sensitive antenna products.

Moreover, in some applications, a BFIC chip may be integrated with a transmitting/receiving module. A transmitting/receiving module generally includes a power amplifier (PA) or a low-noise amplifier (LNA). The power amplifier is used to amplify signals to the desired power level, whereas the low-noise amplifier is used to amplify the signals received. A power amplifier, however, tends to generate a larger amount of heat during operation, and the heat is very likely to affect an adjacent BFIC and/or phase shifter. For example, the overall phase error of the phase-shifting mechanism of a BFIC is increased as a temperature rise changes the resistance of the semiconductor in the BFIC, which affects the beam directivity and overall performance of the antenna array. Furthermore, operation in a high-temperature environment for a long time may accelerate the aging of a BFIC. In view of the above, one of the issues to be addressed in the present disclosure is to provide an effective solution to the foregoing problems.

SUMMARY

To stand out in a competitive market, based on years of practical experience in professional antenna design and the research sprit striving for excellence, and as a result of longtime research and experiments, an array antenna structure with simplified phase control and the antenna product(s) thereof is provided in the present disclosure, so as to provide users and manufacturers with better options.

Certain aspects of the present disclosure are directed to an array antenna structure with simplified phase control. The array antenna structure includes at least one multilayer dielectric substrate, at least one metal waveguide element and at least one RF front-end module. The multilayer dielectric substrate is provided with a plurality of antenna units and a plurality of low-resolution phase control units. Each of the antenna units is configured to radiate at least one first RF signal to outside, receive at least one second RF signal from the outside, or radiate the at least one first RF signal to the outside and receive the at least one second RF signal from the outside. Each of the low-resolution phase control units is electrically connected to a corresponding one of the antenna units. The metal waveguide element has at least one cavity therein, is joined to the multilayer dielectric substrate, and is configured to transmit and guide at least one of the at least one first RF signal and the at least one second RF signal. The RF front-end module is electrically connected to the metal waveguide element and the multilayer dielectric substrate, is configured to make the antenna units to form at least one of at least one focused beam for transmitting RF signals and at least one beam mode for receiving external RF signals, and includes a frequency conversion unit, a plurality of function amplification units and an unequal-length transmission line structure. The frequency conversion unit is configured to convert between low-frequency signals and high-frequency signals. Each of the low-resolution phase control units is electrically connected to one of the function amplification units. The unequal-length transmission line structure has different lengths of transmission paths, electrically connects the frequency conversion unit to each of the function amplification units, and is configured to cause a phase delay in RF signals through the different lengths of the transmission paths. At least one of the function amplification units is connected to the frequency conversion unit through a transmission line that has a length different from the length of the transmission line between another one of the function amplification units and the frequency conversion unit. Accordingly, the array antenna structure not only uses the low-resolution phase control units to reduce cost and circuit complexity, but also produces the aperiodicity of initial phase excitation through the unequal-length transmission line structure, so as to inhibit the grating lobe phenomenon of the antenna units and to maintain the gain of the main beam.

In certain embodiments, each of the low-resolution phase control units includes two electronic switching elements, one end of each of the electronic switching elements is connected to a feed point of the corresponding one of the antenna units, the feed point is electrically connected to a corresponding one of the function amplification units, and the other end of each of the electronic switching elements is connected to a reference potential point. The electronic switching elements are configured to change a current path and provide a change between two phases by having one of the electronic switching elements to be in the OFF state when the other one of the electronic switching elements is in the ON state, which realizes the functions of a 1-bit phase shifter.

In certain embodiments, the low-resolution phase control unit further includes a 1-bit phase shifter electrically connected to the feed point and configured to provide a change in phase, and the low-resolution phase control unit is configured to provide four phase changes by combining the change in phase provided by the 1-bit phase shifter with the change in phase provided by the electronic switching elements through ON and OFF states of the electronic switching elements, thereby realizing the functions of a 2-bit phase shifter.

In certain embodiments, each of the low-resolution phase control units includes a first electronic switching element and a second electronic switching element that are electrically connected to the same one of the function amplification units, a first end of the first electronic switching elements is connected to a first end of the second electronic switching element, and a second end of the first electronic switching elements is connected to a feed point of the corresponding one of the antenna units that is different from another feed point of the antenna unit to which a second end of the second electronic switching element is connected. The electronic switching elements are configured to change a current path and produce a change between two phases by having one of the first and second electronic switching elements to be in the OFF state when the other one of the first and second electronic switching elements is in the ON state, which realizes the functions of a 1-bit phase shifter.

In certain embodiments, the low-resolution phase control unit further includes a 1-bit phase shifter electrically connected to one end of each of the first and second electronic switching elements and configured to provide a change in phase, and the low-resolution phase control unit is configured to provide four phase changes by combining the change in phase provided by the 1-bit phase shifter with the change in phase provided by the first and second electronic switching elements through ON and OFF states of the first and second electronic switching elements, thereby realizing the functions of a 2-bit phase shifter.

In certain embodiments, each of the electronic switching elements is a PIN diode or RF switch.

In certain embodiments, each of the first and second electronic switching elements is a PIN diode or RF switch.

In certain embodiments, the metal waveguide element is provided therein with at least one ridge.

In certain embodiments, the side of the multilayer dielectric substrate that is opposite to the side where the metal waveguide element is located is formed with a plurality of slots to form a plurality of output ports.

In certain embodiments, the antenna units are arranged in a plurality of columns of antenna unit groups, each of the antenna unit groups includes a plurality of antenna units, and the distance between each two adjacent ones of the antenna unit groups is, or smaller than, half of the wavelength corresponding to the working frequency of the array antenna structure.

In certain embodiments, the RF front-end module further includes a heat dissipation module.

In certain embodiments, the RF front-end module further includes a positioning module.

In certain embodiments, the unequal-length transmission line structure is formed based on calculation using an iterative method.

Certain aspects of the present disclosure are directed to an antenna product that includes the afore-referenced array antenna structure with simplified phase control and a light-permeable glass panel fittable to a window frame. The multilayer dielectric substrate and the metal waveguide element are arranged on the light-permeable glass panel, and the RF front-end module is arranged at the window frame or an area adjacent to the window frame and substantially not located on the light-permeable glass panel.

Certain aspects of the present disclosure are directed to an antenna product that includes the afore-referenced array antenna structure with simplified phase control and a panel body. The panel body is substantially in a shape of a panel, and has a flat area configured to be disposed with the multilayer dielectric substrate and the metal waveguide element. A side of the panel body is provided with the RF front-end module.

In certain embodiments, the other side of the panel body is configured to be connected to a housing of an electronic product.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
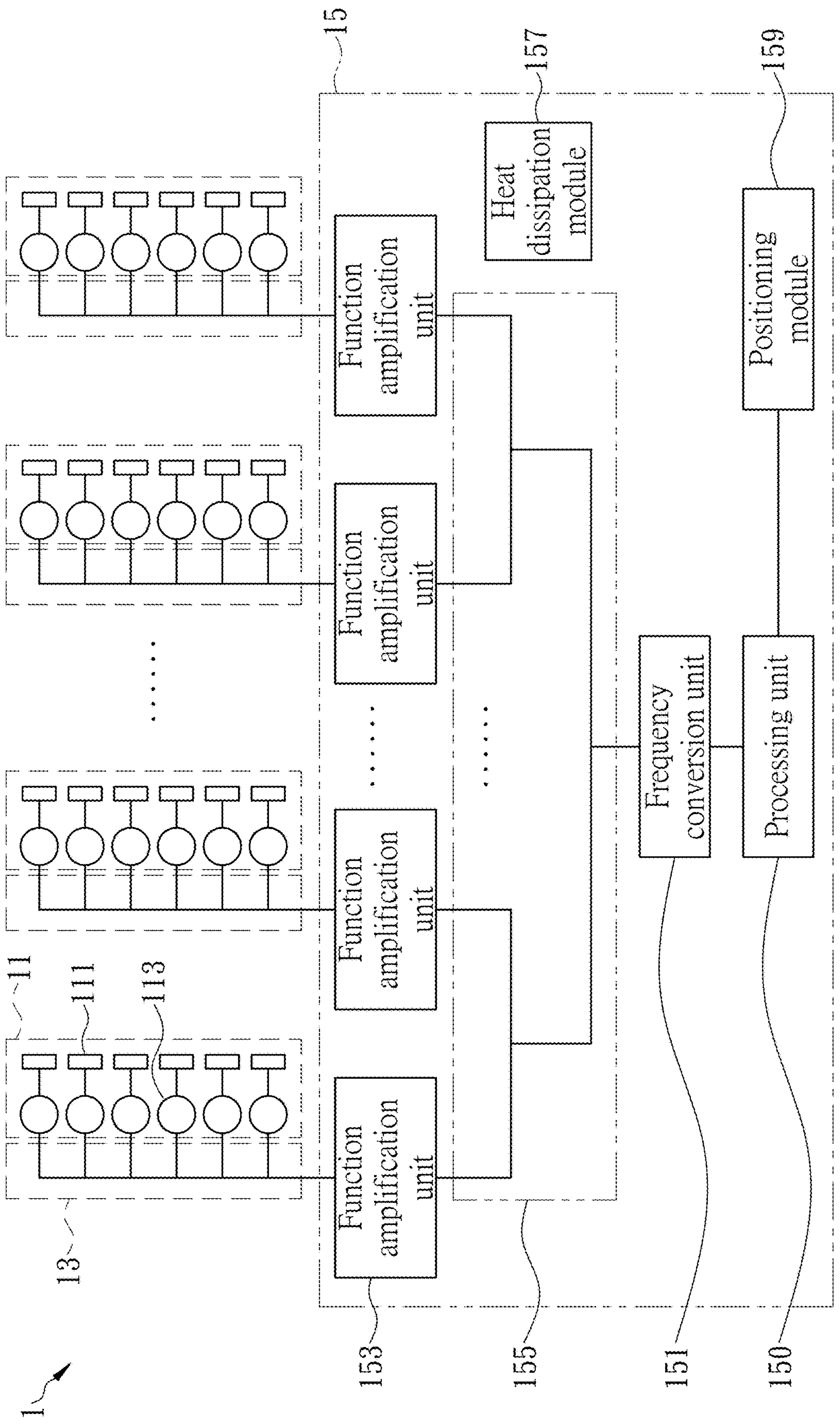
FIG. 1 is a hardware block diagram of an array antenna structure according to certain embodiments of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the term "and/or" includes any and all combinations of one or more of the associated listed items. Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like. Directional terms (e.g., "front", "rear", "left", "right", "upper/top" and/or "lower/bottom") are explanatory only and are not intended to be restrictive of the scope of the present disclosure.

As may be used herein, a numeral value referred in the present disclosure can include a value, or an average of values, in an acceptable deviation range of a particular value recognized or decided by a person of ordinary skill in the art, taking into account any specific quantity of errors related to the measurement of the value that may resulted from limitations of a measurement system or device. For example, a particular numeral value referred in the embodiments of the present disclosure can include ±5%, ±3%, ±1%, ±0.5% or ±0.1%, or one or more standard deviations, of the particular numeral value.

The term "connected" or "electrically connected" as may be referred to in the present disclosure includes connection configurations such as direct connection between two components, indirection connection between two components with at least one component being provided between the two components, etc.

Figure 2:
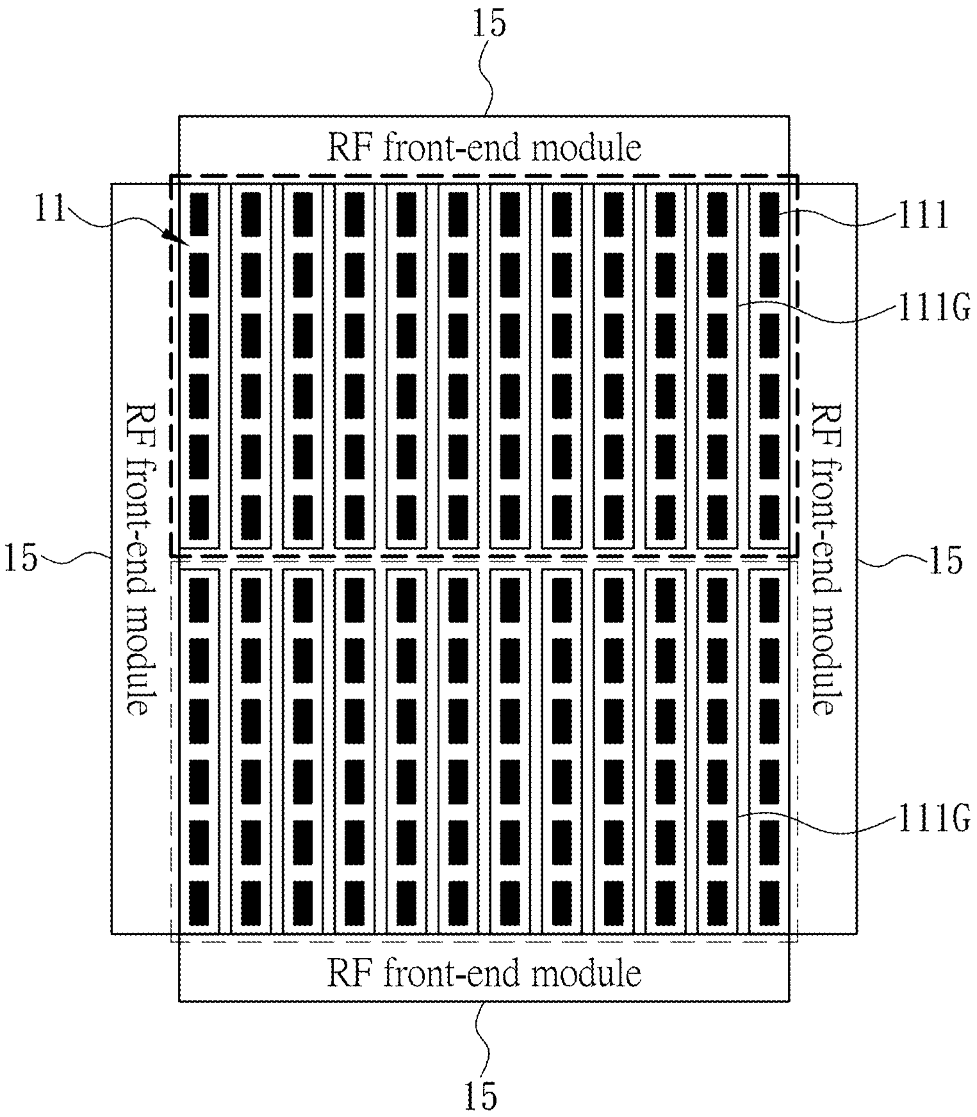
FIG. 2 is a schematic diagram showing the arrangement of antenna unit groups of the array antenna structure according to certain embodiments of the present disclosure.

The present disclosure provides an array antenna structure that features simplified phase control and the antenna product(s) that uses the array antenna structure. Compared to conventional array antenna systems, the array antenna structure in the present disclosure removes the elements used for phase change (phase shifters) from transmitting/receiving modules and adopts phase shifters, or equivalent circuits, that are configured to provide only small changes in phase, which reduces the complexity of the antenna system as a whole. However, it is noted that one or more high-resolution phase shifters are not entirely excluded from the array antenna structure in the present disclosure, and the array antenna structure in the present disclosure can include both the high-resolution phase shifter(s) and low-resolution phase shifter(s). Referring to FIG. 1 and FIG. 2, the array antenna structure 1 includes one or more multilayer dielectric substrates 11, one or more metal waveguide elements 13, and at least one RF front-end module 15. Each multilayer dielectric substrate 11 is provided with a plurality of antenna units 111 and a plurality of low-resolution phase control units 113. Depending on actual product requirements, each multilayer dielectric substrate 11 can include a plurality of layers of dielectric materials having the same electrical performances (e.g., FR-4) or different electrical performances, with one or more of the layers designed specifically to allow placement of the corresponding antenna units 111, and another one or more of the layers designed specifically to allow placement of the corresponding low-resolution phase control units 113. However, the present disclosure is not limited thereto, and in certain embodiments the antenna unit(s) 111 and low-resolution phase control unit(s) 113 can be mixedly arranged in the same layer.

With continued reference to FIG. 1 and FIG. 2, each antenna unit 111 can be a microstrip antenna, patch antenna, or another type of antenna and is configured to radiate one or more RF signals to the outside and/or receive one or more RF signals from the outside. Preferably, each antenna unit 111 is located on or near the top layer of the corresponding multilayer dielectric substrate 11 in order to reduce interference from other electronic elements and optimize radiation efficiency. Furthermore, the antenna units 111 can be arranged in a plurality of columns of antenna unit groups 111G along a first axial direction (e.g., the left-to-right direction in FIG. 2), and each antenna unit group 111G has at least on antenna unit 111 sequentially arranged in a second axial direction (e.g., the top-to-bottom direction in FIG. 2). The arrangement of the antenna units 111, however, is not limited to the foregoing. In FIG. 2 for example, each antenna unit group 111G has six antenna units 111, the multiple antenna unit groups 111G in the upper half of FIG. 2 (as indicated by the bold dashed-line frame) are all used as transmitting antennas, while the multiple antenna unit groups 111G in the lower half of FIG. 2 (as indicated by the thin dashed-line frame) are all used as receiving antennas. It is also feasible that one or more antenna units 111 in the same antenna unit group 111G work as transmitting antennas while the others work as receiving antennas, so that the antenna unit group 111G serves both transmitting and receiving purposes. Besides, to prevent or limit the formation of grating lobes, the distance between each two adjacent antenna unit groups 111G is preferably not greater than half of the wavelength corresponding to the working frequency of the array antenna structure 1.

Figure 3A:
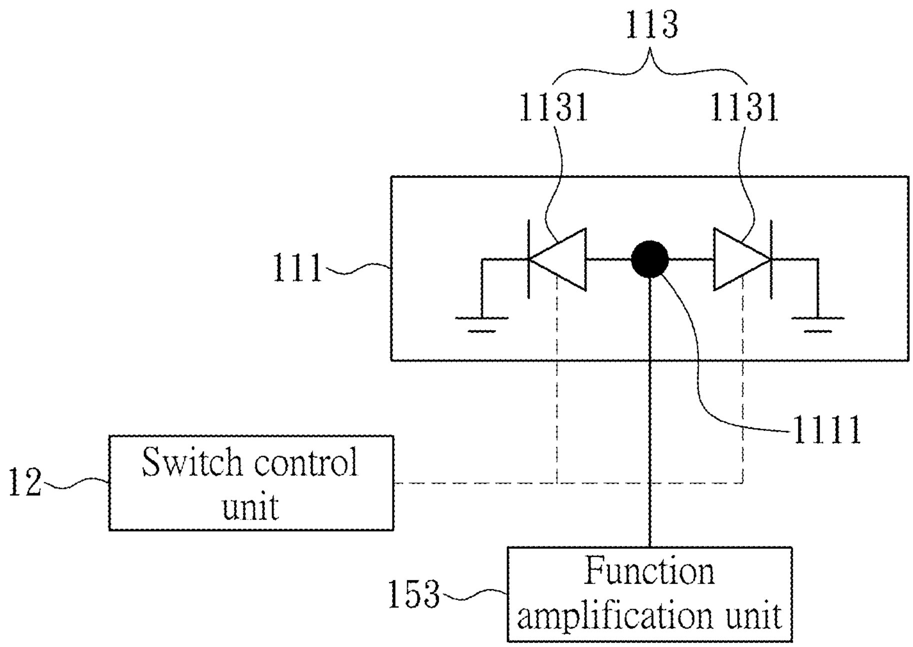
FIG. 3A is a schematic diagram of a low-resolution phase control unit according to certain embodiments of the present disclosure.

Referring again to FIG. 1, each low-resolution phase control unit 113 is electrically connected to the corresponding antenna unit 111 and is configured to provide not more than four phase changes, e.g., to 0 degree, 90 degrees, 180 degrees, and 270 degrees. Based on actual needs, the low-resolution phase control units 113 on each multilayer dielectric substrate 11 can be a single element or a circuit structure having functions equivalent to such a single element. Various embodiments of the low-resolution phase control units 113 are described as follows. In FIG. 3A, in certain embodiments, a low-resolution phase control unit 113 includes two electronic switching elements 1131. The electronic switching elements 1131 can be PIN diodes, RF switches, or other elements whose ON/OFF states can be changed in order to control the current path through the antenna unit 111. The electronic switching elements 1131 are integrated with the antenna unit 111 to direct control the working properties of the antenna unit 111 (e.g., the radiation mode of the electromagnetic field). One end of each electronic switching element 1131 (e.g., the anodes of the PIN diodes) is connected to the feed point 1111 of the antenna unit 111, and the other end of the electronic switching element 1131 (e.g., the cathodes of the PIN diodes) is connected to a reference potential point (e.g., with the electronic switching elements 1131 co-grounded as a result). A switch control unit 12 is responsible for controlling the ON/OFF states of the electronic switching elements 1131 and thereby changing the length of the current path (i.e., the length of the propagation path of RF signals). The switch control unit 12 can be disposed in the RF front-end module 15. However, the present disclosure is not limited thereto, and based on actual design needs, the switch control unit 12 can be disposed in another circuit or chip that is outside of the RF front-end module 15.

In FIG. 3A for example, assuming that the initial state is defined as the electronic switching element 1131 on the right being in the ON state and the electronic switching element 1131 on the left being in the OFF state, and that the radiation mode and polarization direction of the antenna unit 111 in the initial state are set as preset references, when the switch control unit 12 subsequently switches the electronic switching element 1131 on the left to the ON state and the electronic switching element 1131 on the right to the OFF state, the resulting change in the direction of current flow will cause a rotation of the polarization direction of electromagnetic waves such that, compared with the initial state, a 180-degree phase change takes place. Thus, by controlling one of the electronic switching elements 1131 to be in the ON state and the other electronic switching element 1131 to be in the OFF state, the current path can be changed to produce a change between two phases (e.g., 0 degree and 180 degrees), i.e., to switch phases. In other words, this circuit structure effectively performs the function of a 1-bit phase shifter by enabling the low-resolution phase control unit 113 to provide two changes in phase.

Figure 3B:
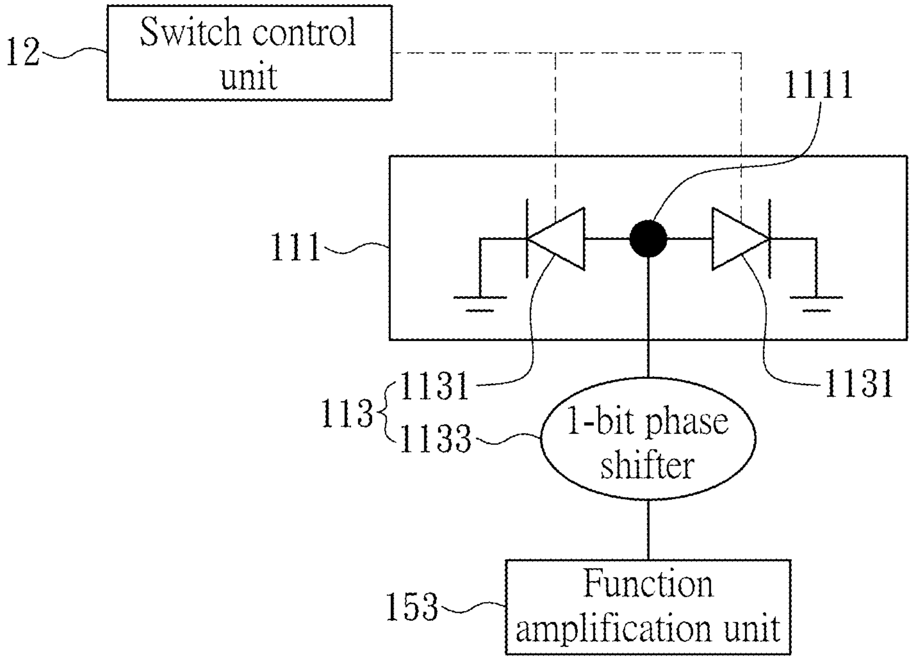
FIG. 3B is a schematic diagram of a low-resolution phase control unit according to certain embodiments of the present disclosure.

Referring to FIG. 3B, in certain embodiments, a 1-bit phase shifter 1133 is added in the afore-referenced circuit structure, is electrically connected to the feed point 1111, and can independently provide two changes in phase, e.g., to 0 degree and 90 degrees. At least one phase (e.g., 90 degrees) of the 1-bit phase shifter 1133 can be different from the two phases (e.g., 0 degree and 180 degrees) of the low-resolution phase control unit 113, so that the phase changes provided by the 1-bit phase shifter 1133 can be combined with the phase changes provided by the electronic switching elements 1131 such that four phase changes (e.g., to 0 degree, 90 degrees, 180 degrees, and 270 degrees) are available for use. In other words, this circuit structure effectively performs the function of a 2-bit phase shifter so that the low-resolution phase control unit 113 provides four changes in phase.

Figure 4A:
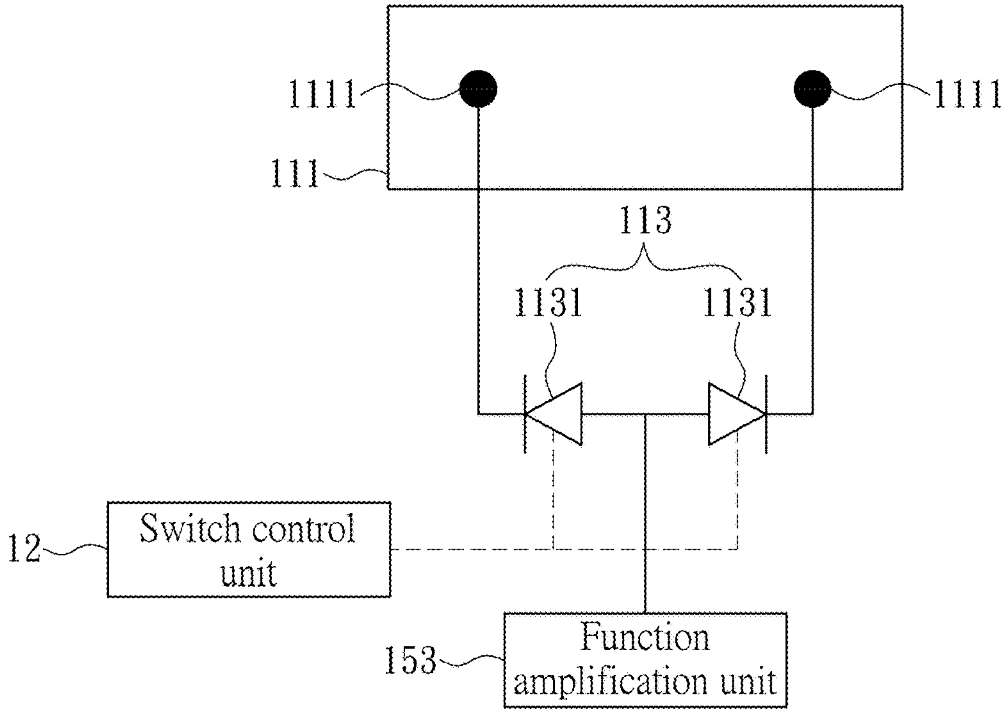
FIG. 4A is a schematic diagram of a low-resolution phase control unit according to certain embodiments of the present disclosure.

In FIG. 4A, in certain embodiments, the low-resolution phase control unit 113 includes two electronic switching elements 1131, one end (hereinafter referred to as the first end) of each electronic switching element 1131 (e.g., the anodes of the PIN diodes) is connected to the first end of the other electronic switching element 1131, and the other end (hereinafter referred to as the second end) of each electronic switching element 1131 (e.g., the cathodes of the PIN diodes) is connected to a feed point 1111 of the antenna unit 111 that is different from another feed point 1111 to which the second end of the other electronic switching element 1131 is connected. A switch control unit 12 is responsible for controlling the ON/OFF states of the electronic switching elements 1131 and thereby changing the current path to excite a different feed point 1111, so as to control the transmission direction of electromagnetic waves and making an adjustment in phase. In FIG. 4A for example, assuming that the initial state is defined as the electronic switching element 1131 on the right being in the ON state and the electronic switching element 1131 on the left being in the OFF state, only the feed point 1111 on the right side of the antenna unit 111 is excited in the initial state, and the radiation mode and polarization direction of the antenna unit 111 in the initial state are set as preset references. When the switch control unit 12 subsequently switches the electronic switching element 1131 on the left to the ON state and the electronic switching element 1131 on the right to the OFF state, only the feed point 1111 on the left side of the antenna unit 111 will be excited such that, compared with the initial state, a 180-degree phase change takes place. Thus, by controlling one of the electronic switching elements 1131 to be in the ON state and the other electronic switching element 1131 to be in the OFF state, the current path can be changed to excite a different feed point 1111, thereby producing a change between two phases (e.g., 0 degree and 180 degrees), i.e., to switch phases. In other words, this circuit structure effectively performs the function of a 1-bit phase shifter.

Figure 4B:
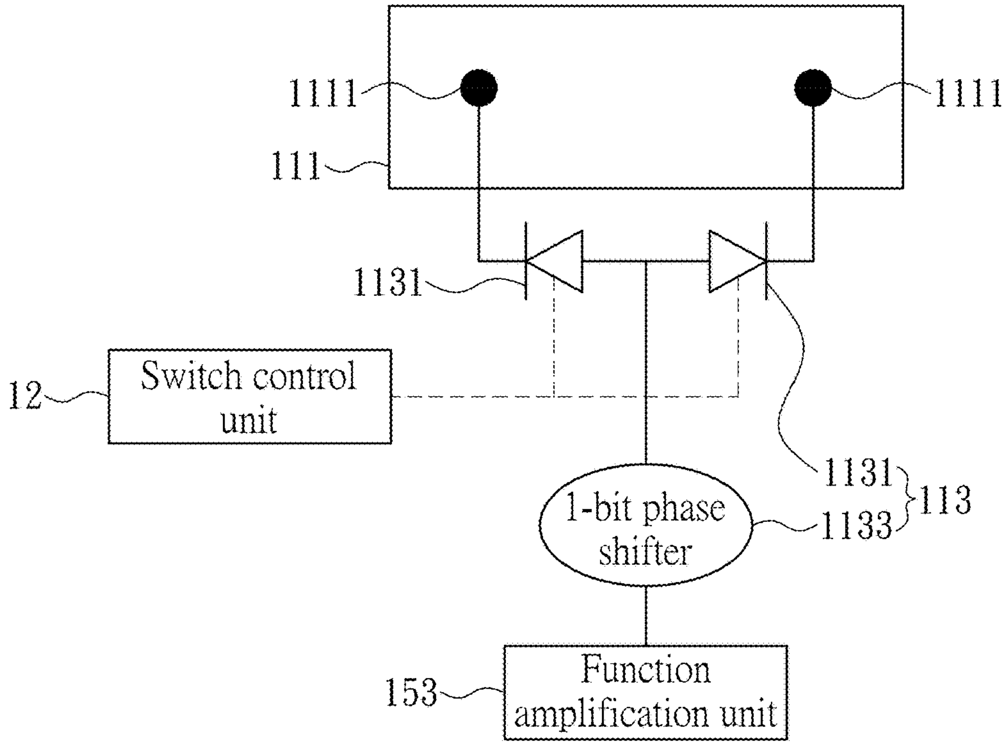
FIG. 4B is a schematic diagram of a low-resolution phase control unit according to certain embodiments of the present disclosure.

Referring to FIG. 4B, in certain embodiments, a 1-bit phase shifter 1133 is added in the afore-referenced circuit structure, is electrically connected to an end of each electronic switching element 1131, and can independently provide two changes in phase, e.g., to 0 degree and 90 degrees. At least one phase (e.g., 90 degrees) of the 1-bit phase shifter 1133 can be different from the two phases (e.g., 0 degree and 180 degrees) of the low-resolution phase control unit 113, so that the phase changes provided by the 1-bit phase shifter 1133 can be combined with the phase changes provided by the electronic switching elements 1131 such that four phase changes (e.g., to 0 degree, 90 degrees, 180 degrees, and 270 degrees) are available for use. In other words, this circuit structure effectively performs the function of a 2-bit phase shifter.

Figure 5A:
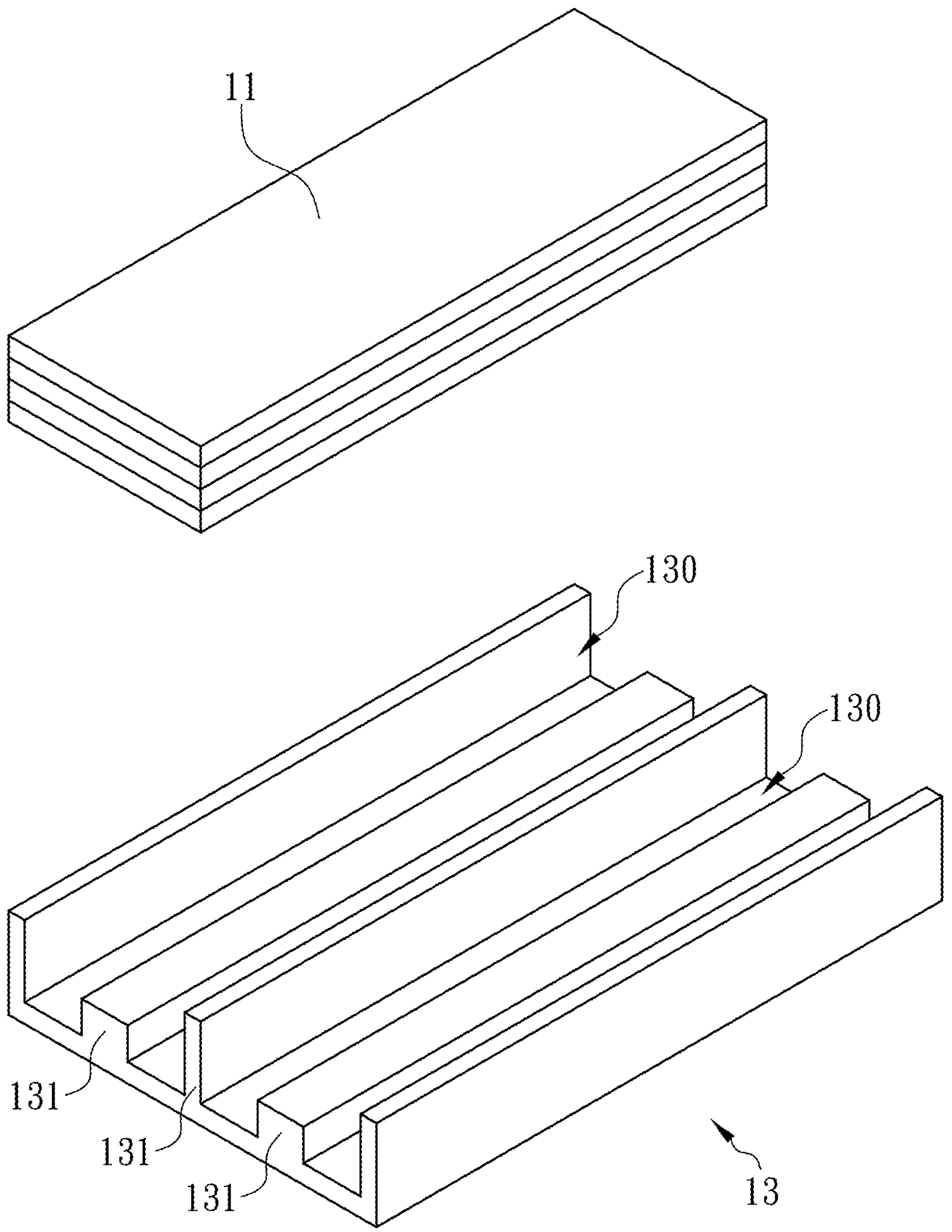
FIG. 5A is a perspective view of a metal waveguide element with at least one ridge and a multilayer dielectric substrate according to certain embodiments of the present disclosure.
Figure 5B:
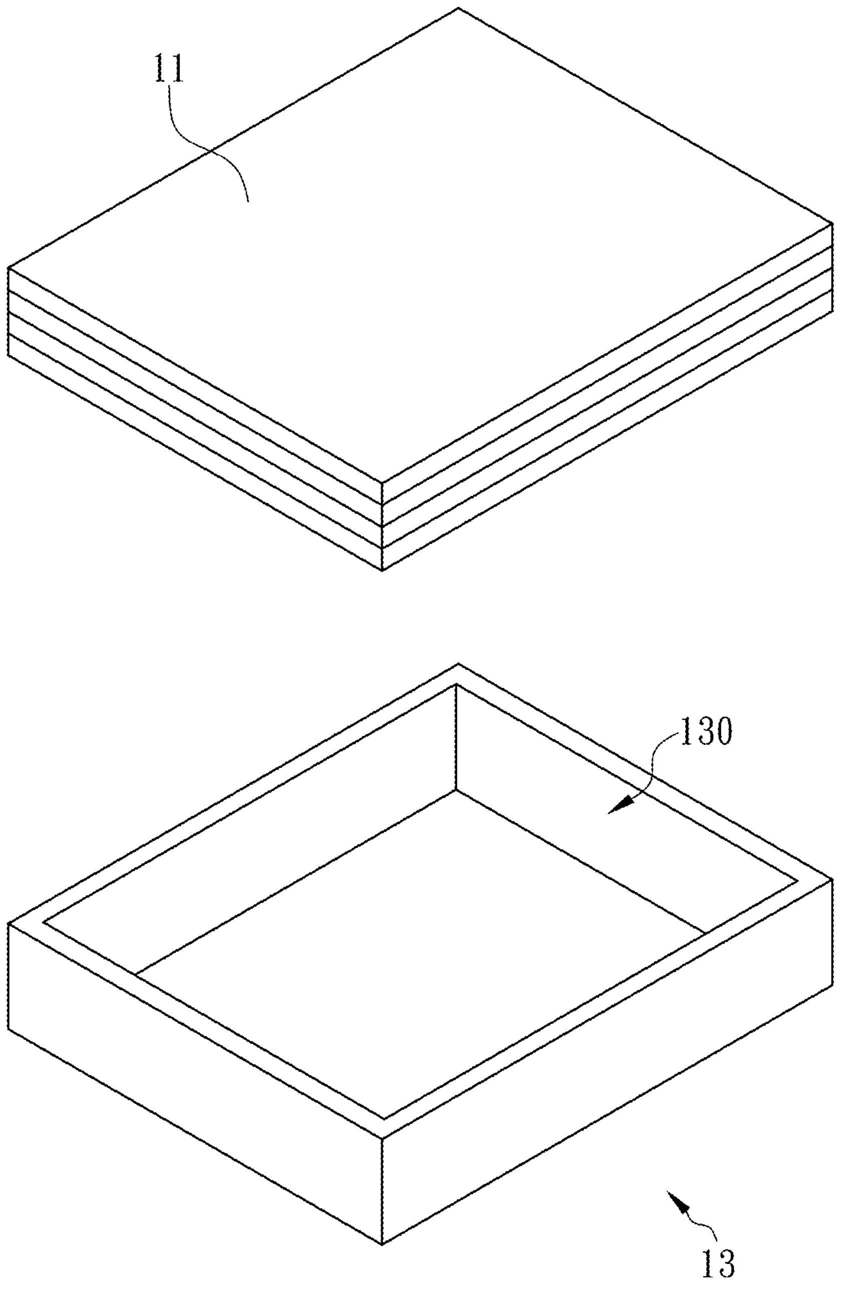
FIG. 5B is a perspective view of a metal waveguide element with no ridge and a multilayer dielectric substrate according to certain embodiments of the present disclosure.
Figure 5C:
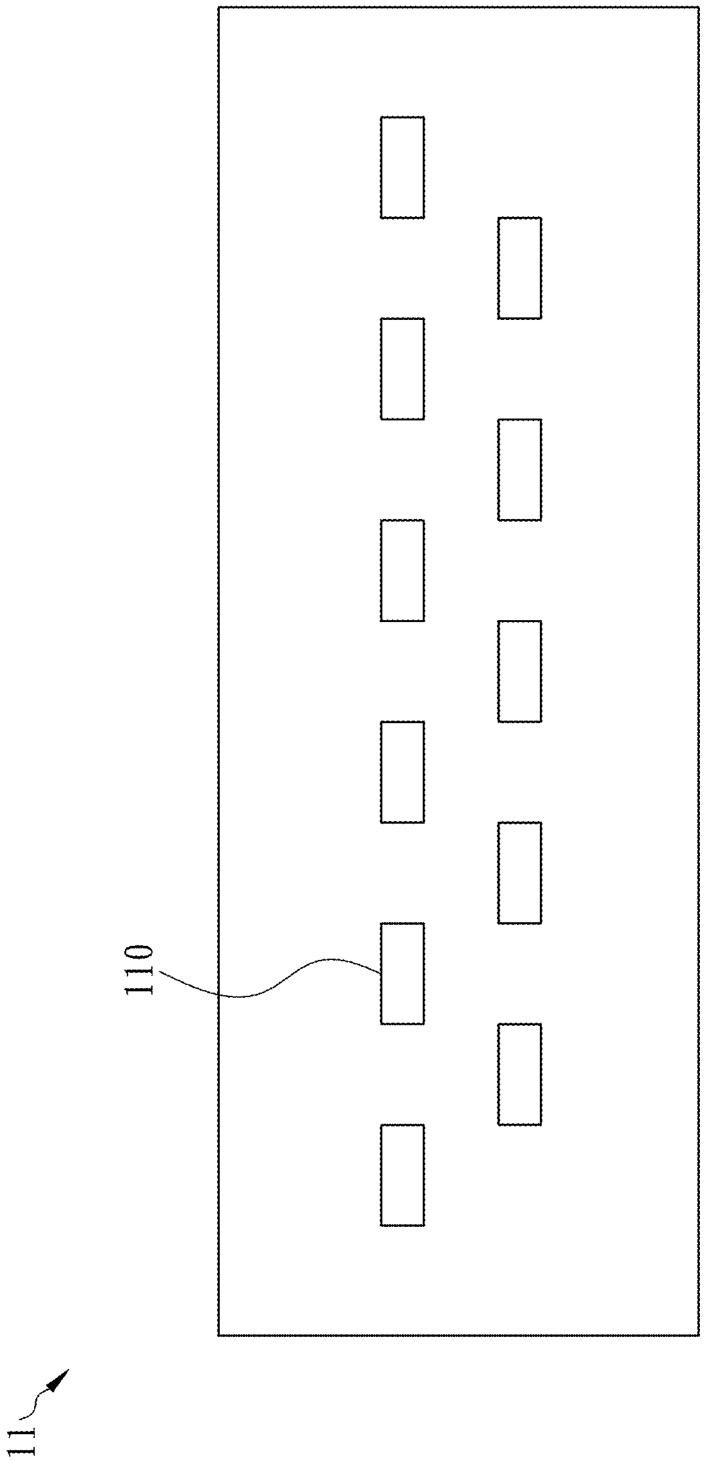
FIG. 5C is a bottom view of a multilayer dielectric substrate according to certain embodiments of the present disclosure.

Referring again to FIG. 1, each metal waveguide element 13 can be joined to the corresponding multilayer dielectric substrate 11 in order to transmit and guide RF signals (i.e., electromagnetic waves). In certain embodiments, referring to FIG. 5A, the metal waveguide element 13 is provided with at least one raised ridge 131 that defines a plurality of cavities 130 by division. Each ridge 131 can have the same size and shape or a different size and shape so as to increase the propagation efficiency and phase control speed in specific modes (e.g., a transverse electric field mode, a transverse magnetic field mode, etc.). When a multilayer dielectric substrate 11 is mounted on the top surface of the corresponding metal waveguide element 13 (with reference to the directions in FIG. 5A), the cavities 130 of the metal waveguide element 13 can be in or not in communication with one another, depending on the number and height(s) of the at least one ridge 131 of the metal waveguide element 13. In certain embodiments, according to actual needs, referring to FIG. 5B, one or more metal waveguide elements 13 can be provided with no ridge 131 but a smooth inner wall and a single cavity 130, and such a metal waveguide element 13 can be used in a wide frequency range (compared with a metal waveguide element 13 with at least one ridge 131), and can be easily manufactured to help in cost reduction. In certain embodiments, referring to FIG. 5C, the electromagnetic coupling between the metal waveguide element 13 and the corresponding antenna unit 111 can be enhanced by forming a plurality of slots 110 on the bottom surface of the corresponding multilayer dielectric substrate 11, with the slots 110 serving as output ports so that the antenna units 111 in/on the corresponding multilayer dielectric substrate 11 can couple electromagnetic waves to the metal waveguide element 13 through the slots 110. The slots 110 can also optimize the incidence and reflection processes of electromagnetic waves to improve the performance and the speed of response of the antenna system as a whole. The spacing among, as well as the number, size, shape, and arrangement of, the slots 110 can be adjusted according to product requirements.

Referring again to FIG. 1, the at least one RF front-end module 15 is electrically connected to the corresponding metal waveguide elements 13 and multilayer dielectric substrates 11, and as shown in FIG. 2, the at least one RF front-end module 15 can be located around, and along the periphery of, the area where the antenna units 111 are provided. Each RF front-end module 15 includes a frequency conversion unit 151, a plurality of function amplification units 153, and an unequal-length transmission line structure 155. In certain embodiments, each RF front-end module 15 is further provided with a processing unit 150 (such as but not limited to a BFIC chip). In certain embodiments, the processing unit 150 is located outside the RF front-end module 15 and is electrically connected to the RF front-end module 15. An RF front-end module 15 that supports signal transmitting operations enables the corresponding antenna units 111 to radiate RF signals outward. To this end, the frequency conversion unit 151 of such an RF front-end module 15 works in a way equivalent to that of an upconverter, serving mainly to convert low-frequency signals (e.g., baseband signals) or intermediate-frequency signals into high-frequency signals (e.g., RF signals), and each function amplification unit 153 of such an RF front-end module 15 may be a PA for amplifying the power of RF signals, and can be electrically connected to one or more corresponding low-resolution phase control units 113. For example, the function amplification unit 153 can be electrically connected to a feeding point 1111 exemplarily shown in FIG. 3A so as to be connected to one end of each corresponding electronic switching element 1131. In certain embodiments, the function amplification unit 153 can be electrically connected to one end of each corresponding electronic switching element 1131 exemplarily shown in FIG. 4A.

With continued reference to FIG. 1, the unequal-length transmission line structure 155 is configured to electrically connect the frequency conversion unit 151 to each function amplification unit 153 so that the RF signals formed by the frequency conversion unit 151 can be transmitted to each function amplification unit 153. It should be pointed out that as the low-resolution phase control units 113 have a limited range of phase changes, which limits precise control of the phase distribution of the array antenna and may produce grating lobes, the unequal-length transmission line structure 155 is designed to introduce uneven or random phase differences between the antenna units 111, so as to break the excitation periodicity of the antenna array, thereby optimizing the radiation pattern and reducing the effect of grating lobes, and eventually forming the desired beam and radiation direction and preventing energy from being dispersed in unintended directions. Preferably, the length of the transmission line between each function amplification unit 153 and the frequency conversion unit 151 is different so that the different lengths of the transmission paths cause a phase delay in RF signals. The unequal-length transmission line structure 155, however, is not necessarily so designed. In certain embodiments, based on actual needs, it is feasible that at least one of the function amplification units 153 is connected to the frequency conversion unit 151 through a transmission line that has a length different from the length of the transmission line between another function amplification unit 153 and the frequency conversion unit 151.

Furthermore, with continued reference to FIG. 1, the array antenna structure 1 not only uses the low-resolution phase control units 113 to reduce cost and circuit complexity, but also produce the aperiodicity of initial phase excitation to inhibit the grating lobe phenomenon of the antenna units 111 and to maintain the gain of the main beam. The following equation (1) describes how a result of discrete Fourier transform (DFT) simulates an approximate peaked distribution by adjusting the phase of each antenna unit 111 within a limited range of phase changes:

$$E(\theta_{g,pq}) = E_{ele}(\theta_{g,pq})\left[\sum\nolimits_{m=1}^{M}\left[\sum\nolimits_{n=1}^{N} e^{j\Delta\phi_{n_t}}\right]e^{j\frac{(n-1)}{N}2\pi q}e^{j\frac{m-1}{M}2\pi p}\right] \quad (1)$$

where:

$E(\theta_{g,pq})$ is the total electric field in the direction $\theta_{g,pq}$;

$E_{ele}(\theta_{g,pq})$ is the response of an antenna unit 111 in the direction $\theta_{g,pq}$ (an exhibition of electromagnetic properties);

$$\sum\nolimits_{m=1}^{M}$$

is to perform summation on all the M antenna unit groups 111G, showing the result of superposition of all the columns (i.e., antenna unit groups 111G) that are arranged in the horizontal direction (e.g., the left-to-right direction in FIG. 2);

$$\sum\nolimits_{m=1}^{N}$$

is to perform summation on all the N antenna unit(s) 111, showing the result of superposition of all the antenna unit(s) 111 in each column (e.g., the top-to-bottom direction in FIG. 2);

$e^{j\Delta\phi_{n_t}}$ is the phase change of the $n_t^{th}$ antenna unit 111, wherein $\Delta\phi_{n_t}$ is the phase shift of the antenna unit 111;

$$e^{j\frac{(n-1)}{N}2\pi q}$$

is the phase difference of the $n^{th}$ antenna unit 111 with respect to the other antenna unit groups 111G, wherein q is the designated beam scanning direction; and $$e^{j\frac{(m-1)}{M}2\pi p}$$

is the phase difference of the $m^{th}$ antenna unit group 111G with respect to the other antenna unit groups 111G, wherein p is the designated beam scanning direction, and wherein the beam scanning directions of q and p can be the same or different.

With continued reference to FIG. 1, to ensure the main beam of the antenna unit groups 111G has the highest gain, and to reduce unnecessary side lobes (i.e., grating lobes) to the greatest extent, a cost function is used to optimize the overall design. Referring to the following equation (2), the performance of the antenna array as a whole is optimized by minimizing the sum of the phase errors of the sub-arrays (i.e., antenna unit groups 111G) in each target direction:

$$\emptyset = \sum_{q=1}^{N_b} \sum_{n_t}^{N_t} \left(\Delta\emptyset_{n_t}(\theta_d^q)\right)^2 \tag{2}$$

where:

Ø is a cost function showing the target value (i.e., sum of phase errors) that requires minimization during the optimization process;

$$\sum_{q=1}^{N_b}$$

is to perform summation on all the target-beam directions (i.e., from 1 to $N_b$), wherein $N_b$ is the number of target beams;

$$\sum_{n_t}^{N_t}$$

is to perform summation on all the sub-arrays (i.e., antenna unit groups 111G) (i.e., from $n_t$ to $N_t$), wherein $N_t$ is the number of sub-arrays; and $$\left(\Delta\emptyset_{n_t}(\theta_d^q)\right)^2$$

is the square of the phase error of the $n_t^{th}$ sub-array in the $q^{th}$ target direction $$\theta_d^q,$$

showing the difference between the phase setting and the ideal phase in a target direction, wherein the square of the phase error is used to emphasize the impact of the error so that the cost function has higher sensitivity to a greater error.

Minimization of the cost function given by equation (2) can be carried out using an iterative method, in particular a genetic algorithm (GA), so as to calculate and thereby determine the configuration of the unequal-length transmission line structure 155 for reducing the effect of grating lobes and optimizing the gain of the main beam. The configuration of the unequal-length transmission line structure 155, however, is not necessarily determined as described above. Depending on actual product requirements, an alternative algorithm may be used to design the configuration of the unequal-length transmission line structure 155.

Besides, with continued reference to FIG. 1, an RF front-end module 15 that supports signal receiving operations enables the corresponding antenna units 111 to receive RF signals from the outside. To this end, the frequency conversion unit 151 of such an RF front-end module 15 works in a way equivalent to that of a downconverter, serving mainly to convert high-frequency signals (e.g., RF signals) into low-frequency signals (e.g., baseband signals) or intermediate-frequency signals, and each function amplification unit 153 of such an RF front-end module 15 can be a LNA to amplify one or more external RF signals to a sufficiently high power level without significantly increasing the noise of the RF signal(s), and can be electrically connected to the corresponding low-resolution phase control units 113. The unequal-length transmission line structure 155 is configured to electrically connect the frequency conversion unit 151 to each function amplification unit 153 so that the RF signal(s) amplified by the function amplification units 153 can be transmitted to the frequency conversion unit 151. At least one of the function amplification units 153 is connected to the frequency conversion unit 151 through a transmission line that has a length different from the length of the transmission line between another function amplification unit 153 and the frequency conversion unit 151.

In certain embodiments, the antenna units 111 serve only as transmitting antennas or receiving antennas. For example, all the antenna units 111 in the upper half of FIG. 2 can be transmitting antennas capable of forming focused beams for transmitting RF signals. Accordingly, the RF front-end module(s) 15 electrically connected to these antenna units 111 are structured to support signal transmitting operations. For example, all the antenna units 111 in the lower half of FIG. 2 can be receiving antennas capable of forming a beam mode for receiving external RF signals. Accordingly, the RF front-end module(s) 15 electrically connected to these antenna units 111 are structured to support signal receiving operations. In certain embodiments, however, at least one RF front-end module 15 can be structured to support both signal transmitting operations and signal receiving operations, that is, the RF front-end module 15 can include an upconverter, a downconverter, power amplifiers, low-noise amplifiers, and a switch circuit for switching between a signal transmitting operation and a signal receiving operation, thereby allowing the antenna units 111 to have both a transmitting antenna mode and a receiving antenna mode. Furthermore, as each RF front-end module 15 tends to generate a large amount of heat during operation, each RF front-end module 15 further includes a heat dissipation module 157. In certain embodiments, each heat dissipation module 157 can be one or a combination of a fan, heat dissipation fins, heat dissipation paste, and other heat dissipation elements. In certain embodiments, each heat dissipation module 157 may be in the form of a heat dissipation space or a heat dissipation duct, as long as the heat dissipation module 157 can guide away from the corresponding RF front-end module 15 the heat generated by each element of the corresponding RF front-end module 15 during operation.

Figure 6:
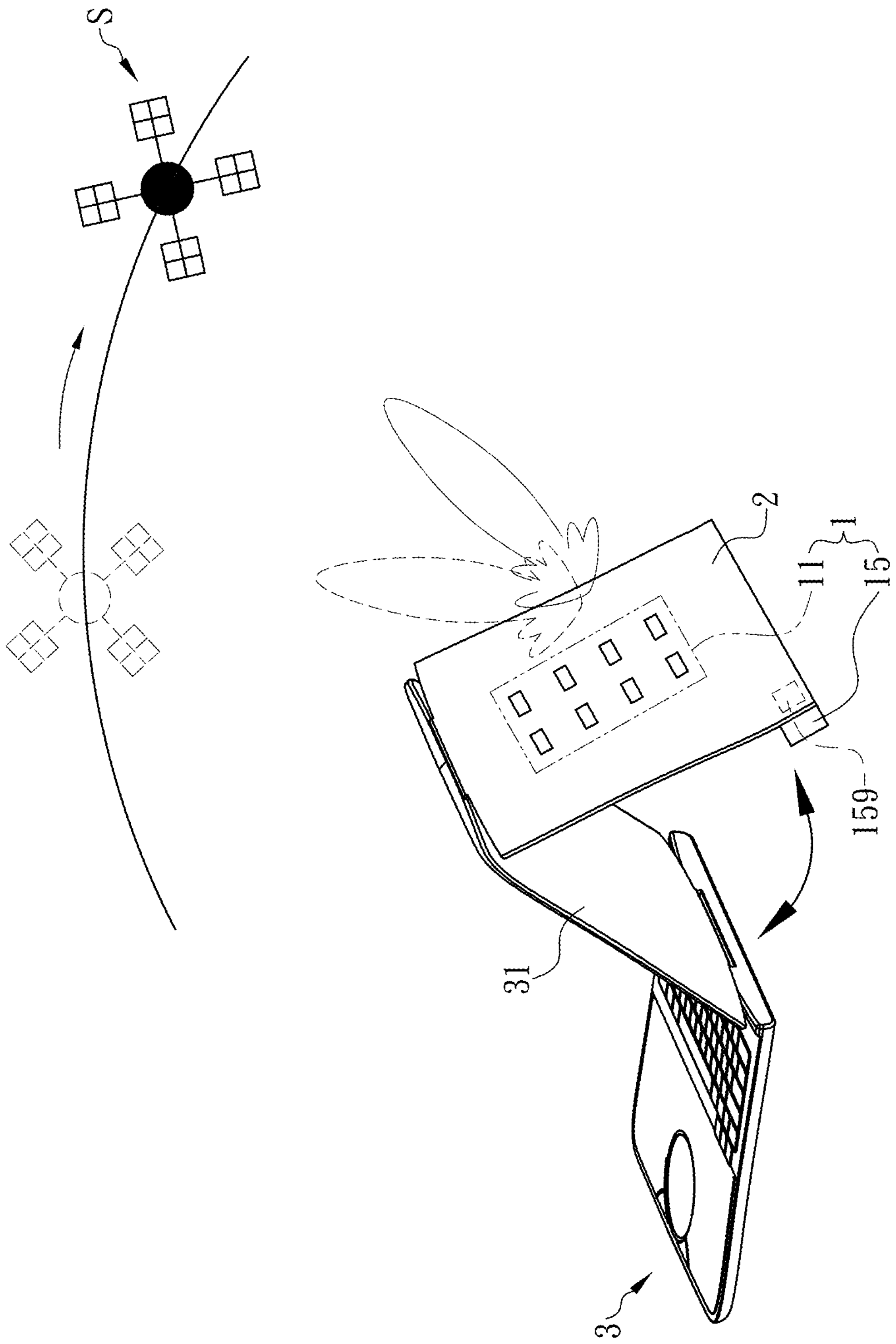
FIG. 6 is a schematic diagram showing an antenna product that is an externally mounted antenna according to certain embodiments of the present disclosure.

Various antenna products using the array antenna structure 1 are described below. Those antenna products can be generally divided into three product categories. The first category is externally mounted antennas, the second category is movable antennas, and the third category is hidden antennas. Referring to FIG. 6 in conjunction with FIG. 1 for an antenna product of the first category (i.e., an externally mounted antenna), the array antenna structure 1 can be integrated into a panel body 2, wherein the panel body 2 is configured to be connected to (e.g., pivotally connected to, engaged with, or slidably coupled to) the housing 31 of an electronic product 3 (e.g., a laptop computer or tablet computer). A user may choose to store the panel body 2 by folding it against the electronic product 3 or unfold the panel body 2 with respect to the electronic product 3 in order to use the panel body 2 as a support. The panel body 2 is substantially in the shape of a panel and has a flat area where the multilayer dielectric substrate(s) 11 and metal waveguide element(s) 13 can be provided. One side of the panel body 2 (e.g., the bottom side as shown in FIG. 6, hereinafter referred to as the first side of the panel body 2) may be provided with an RF front-end module 15, and the opposite side of the panel body 2 (e.g., the top side as shown in FIG. 6) may be configured for connection with the electronic product 3. When the panel body 2 is unfolded, the first side of the panel body 2 is located away from the electronic product 3 such that a relatively large space is formed between the RF front-end module 15 and the electronic product 3 to enable rapid heat dissipation, so that the heat generated by the RF front-end module 15 will not affect the electronic product 3, the multilayer dielectric substrate(s) 11, the metal waveguide element(s) 13, etc.

With continued reference to FIG. 6 in conjunction with FIG. 1, in certain embodiments, to ensure that the antenna product has the capacity of tracking satellites (e.g., a low-Earth-orbit satellite S), the RF front-end module 15 can be further provided with a positioning module 159 (e.g., a gyroscope or a global positioning system (GPS) chip) for bringing the externally mounted antenna into directional alignment and for performing satellite orbit tracking and beam scanning, wherein the positioning module 159 is configured to send information to and receive information from the processing unit 150. As certain electronic products themselves are equipped with a gyroscope or a GPS chip, the array antenna structure 1 may dispense with the positioning module 159 and use the processing unit 150 to exchange information with such an electronic product 3 in order to obtain values from the gyroscope or GPS chip of the electronic product 3 and use the values in the foregoing directional alignment, satellite orbit tracking, and beam scanning operations.

Figure 7:
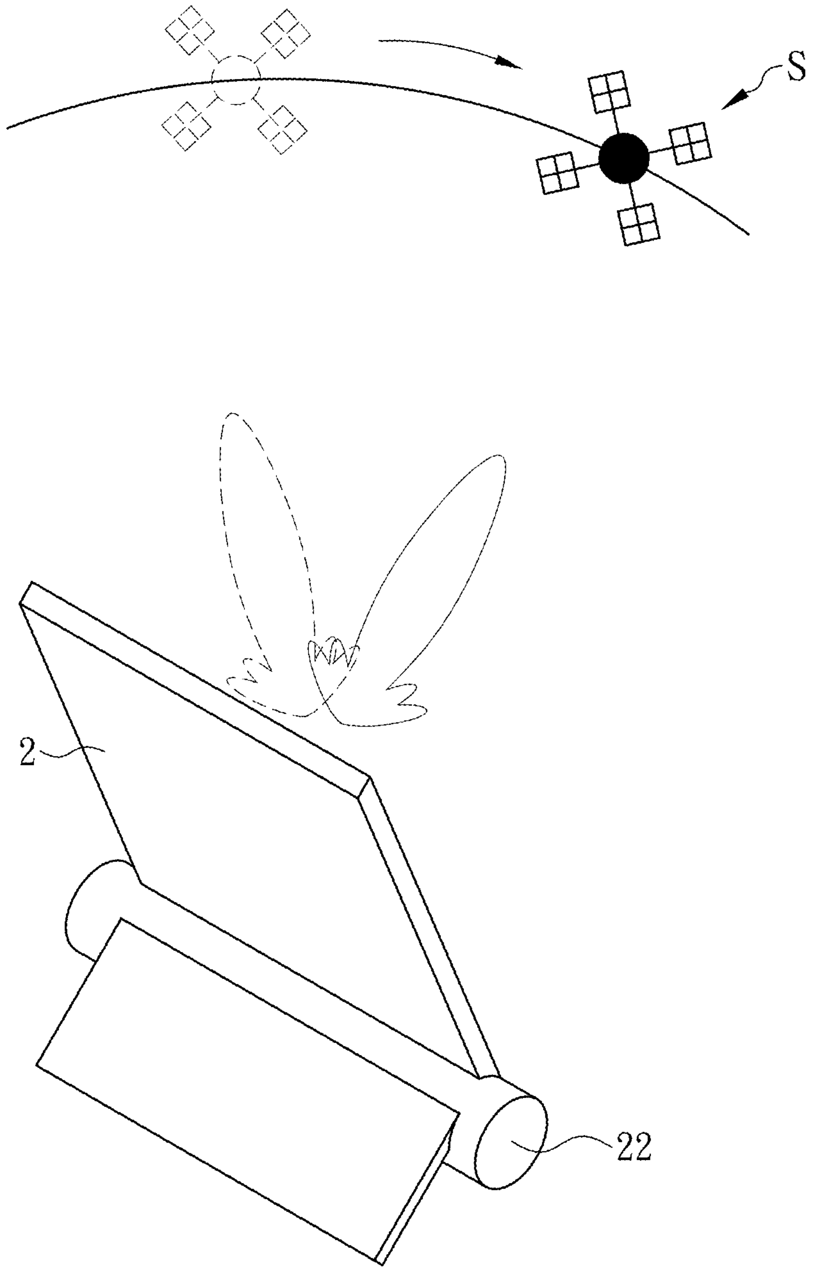
FIG. 7 is a schematic diagram showing an antenna product that is a movable antenna according to certain embodiments of the present disclosure.

Referring to FIG. 7 in conjunction with FIG. 1 for an antenna product of the second category (i.e., a movable antenna), the array antenna structure 1 may also be integrated into a panel body 2, but this panel body 2 is different from the one in FIG. 6 in that the panel body 2 in FIG. 7 is configured to be placed independently and need not be connected to an electronic product 3. One side of the panel body 2 in FIG. 7 may be provided with a rotation mechanism 22 for adjusting the orientation of the flat area of the panel body 2, thereby facilitating the tracking of a satellite S.

Figure 8:
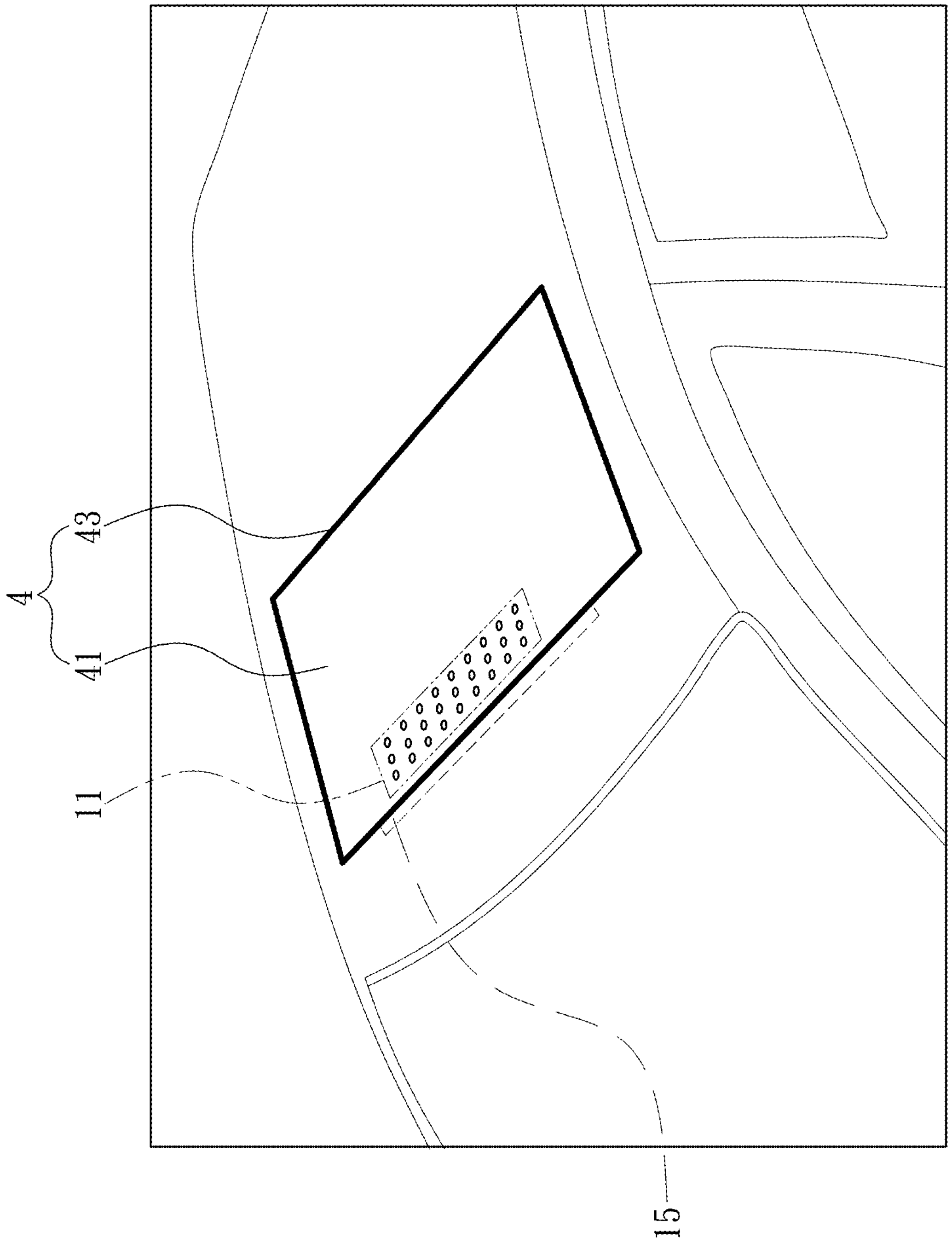
FIG. 8 is a schematic diagram showing an antenna product that is a hidden antenna according to certain embodiments of the present disclosure.

Referring to FIG. 8 in conjunction with FIG. 1 for an antenna product of the third category (i.e., a hidden antenna), the array antenna structure 1 may be directly integrated into a piece of equipment such as the sunroof of a vehicle or a French window of a residential building. Take the equipment 4 with a light-permeable glass panel 41 (e.g., the sunroof of a vehicle) for example, the light-permeable glass panel 41 can be fitted in a window frame 43, and the multilayer dielectric substrate(s) 11 and metal waveguide element(s) 13 can be arranged on the light-permeable glass panel 41 while an RF front-end module 15 can be arranged at the window frame 43 or in an area adjacent to the window frame 43. The multilayer dielectric substrate(s) 11 and the metal waveguide element(s) 13 will not compromise the transparency of the light-permeable glass panel 41 because they are relatively small in size and are therefore only small black dots from a user's point of view. The area where the RF front-end module 15 is located need not be transparent and is therefore a suitable area where the related circuits, the heat dissipation module 157, the positioning module 159, and other necessary electronic elements can be disposed. That is to say, the RF front-end module 15 is substantially not located on the light-permeable glass panel 41; however, circuit portions of the RF front-end module 15 that are connected to the metal waveguide element(s) 13 or to the multilayer dielectric substrate(s) 11 are not limited thereto.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An array antenna structure, comprising:

at least one multilayer dielectric substrate provided with a plurality of antenna units and a plurality of low-resolution phase control units, wherein each of the antenna units is configured to radiate at least one first radio-frequency (RF) signal to outside, receive at least one second RF signal from the outside, or radiate the at least one first RF signal to the outside and receive the at least one second RF signal from the outside, and each of the low-resolution phase control units is electrically connected to a corresponding one of the antenna units;

at least one metal waveguide element having at least one cavity therein, joined to the multilayer dielectric substrate and configured to transmit and guide at least one of the at least one first RF signal and the at least one second RF signal; and at least one RF front-end module electrically connected to the metal waveguide element and the multilayer dielectric substrate, configured to make the antenna units to form at least one of at least one focused beam for transmitting RF signals and at least one beam mode for receiving external RF signals, and comprising:

a frequency conversion unit configured to convert between low-frequency signals and high-frequency signals;

a plurality of function amplification units, wherein each of the low-resolution phase control units is electrically connected to one of the function amplification units; and an unequal-length transmission line structure having different lengths of transmission paths, electrically connecting the frequency conversion unit to each of the function amplification units and configured to cause a phase delay in RF signals through the different lengths of the transmission paths, wherein at least one of the function amplification units is connected to the frequency conversion unit through a transmission line that has a length different from a length of a transmission line between another one of the function amplification units and the frequency conversion unit.

2. The array antenna structure according to claim 1, wherein each of the low-resolution phase control units includes two electronic switching elements, one end of each of the electronic switching elements is connected to a feed point of the corresponding one of the antenna units, the feed point is electrically connected to a corresponding one of the function amplification units, and the other end of each of the electronic switching elements is connected to a reference potential point; and the electronic switching elements are configured to change a current path and provide a change between two phases by having one of the electronic switching elements to be in an OFF state when the other one of the electronic switching elements is in an ON state.

3. The array antenna structure according to claim 2, wherein the low-resolution phase control unit further includes a 1-bit phase shifter electrically connected to the feed point and configured to provide a change in phase, and the low-resolution phase control unit is configured to provide four phase changes by combining the change in phase provided by the 1-bit phase shifter with the change in phase provided by the electronic switching elements through ON and OFF states of the electronic switching elements.

4. The array antenna structure according to claim 2, wherein each of the electronic switching elements is a PIN diode or RF switch.

5. The array antenna structure according to claim 1, wherein each of the low-resolution phase control units includes a first electronic switching element and a second electronic switching element that are electrically connected to the same one of the function amplification units, a first end of the first electronic switching elements is connected to a first end of the second electronic switching element, and a second end of the first electronic switching elements is connected to a feed point of the corresponding one of the antenna units that is different from another feed point of the antenna unit to which a second end of the second electronic switching element is connected; and the electronic switching elements are configured to change a current path and produce a change between two phases by having one of the first and second electronic switching elements to be in an OFF state when the other one of the first and second electronic switching elements is in an ON state.

6. The array antenna structure according to claim 5, wherein the low-resolution phase control unit further includes a 1-bit phase shifter electrically connected to one end of each of the first and second electronic switching elements and configured to provide a change in phase, and the low-resolution phase control unit is configured to provide four phase changes by combining the change in phase provided by the 1-bit phase shifter with the change in phase provided by the first and second electronic switching elements through ON and OFF states of the first and second electronic switching elements.

7. The array antenna structure according to claim 5, wherein each of the first and second electronic switching elements is a PIN diode or RF switch.

8. The array antenna structure according to claim 1, wherein the metal waveguide element is provided therein with at least one ridge.

9. The array antenna structure according to claim 1, wherein a side of the multilayer dielectric substrate that is opposite to a side where the metal waveguide element is located is formed with a plurality of slots to form a plurality of output ports.

10. The array antenna structure according to claim 1, wherein the antenna units are arranged in a plurality of columns of antenna unit groups, each of the antenna unit groups includes a plurality of antenna units, and a distance between each two adjacent ones of the antenna unit groups is, or smaller than, half of a wavelength corresponding to a working frequency of the array antenna structure.

11. The array antenna structure according to claim 1, wherein the RF front-end module further includes a heat dissipation module.

12. The array antenna structure according to claim 1, wherein the RF front-end module further includes a positioning module.

13. The array antenna structure according to claim 1, wherein the unequal-length transmission line structure is formed based on calculation using an iterative method.

14. An antenna product, comprising:

the array antenna structure according to claim 1; and a light-permeable glass panel fittable to a window frame, wherein the multilayer dielectric substrate and the metal waveguide element are arranged on the light-permeable glass panel and the RF front-end module is arranged at the window frame or an area adjacent to the window frame and substantially not located on the light-permeable glass panel.

15. An antenna product, comprising:

the array antenna structure according to claim 1; and a panel body substantially in a shape of a panel, and having a flat area configured to be disposed with the multilayer dielectric substrate and the metal waveguide element, wherein a side of the panel body is provided with the RF front-end module.

16. The antenna product according to claim 15, wherein the other side of the panel body is configured to be connected to a housing of an electronic product.

* * * * *